(12) United States Patent
Gaegauf

(10) Patent No.: US 9,421,667 B2
(45) Date of Patent: Aug. 23, 2016

(54) MACHINE TOOL FOR MEASURING A WORKPIECE

(71) Applicant: FRITZ STUDER AG, Steffisburg (CH)

(72) Inventor: Fred Gaegauf, Hagendorn (CH)

(73) Assignee: FRITZ STUDER AG, Steffisburg (CH)

( * ) Notice: Subject to any disclaimer, the term of this patent is extended or adjusted under 35 U.S.C. 154(b) by 175 days.

(21) Appl. No.: 14/227,141

(22) Filed: Mar. 27, 2014

(65) Prior Publication Data
US 2014/0213148 A1  Jul. 31, 2014

Related U.S. Application Data

(63) Continuation of application No. PCT/EP2012/068947, filed on Sep. 26, 2012.

(30) Foreign Application Priority Data

Sep. 27, 2011  (DE) .................. 10 2011 115 254

(51) Int. Cl.
*B24B 9/04* (2006.01)
*B24B 49/04* (2006.01)
(Continued)

(52) U.S. Cl.
CPC .............. *B24B 49/045* (2013.01); *B23Q 17/20* (2013.01); *B23Q 17/2233* (2013.01); *B24B 5/04* (2013.01);
(Continued)

(58) Field of Classification Search
CPC ...... B23Q 17/20; B23Q 17/2233; B24B 5/04; B24B 5/42; B24B 49/03; B24B 49/045; B24B 49/10; B24B 51/00; G01B 3/30; G01B 21/12
See application file for complete search history.

(56) References Cited

U.S. PATENT DOCUMENTS 4,606,130 A * 8/1986 Vetter .................. G01B 5/0002
                                                        33/501.03
4,637,144 A * 1/1987 Schemel ................ B23Q 17/20
                                                        33/501.03
(Continued)

FOREIGN PATENT DOCUMENTS

DE  4412682 A1  10/1995
DE  19616353 A1  10/1997
(Continued)

OTHER PUBLICATIONS

International Search Report (Including Translation) for corresponding International Application No. PCT/EP2012/068947, mailed Jan. 4, 2013.

(Continued)

*Primary Examiner* — Timothy V Eley
(74) *Attorney, Agent, or Firm* — Jason H. Vick; Sheridan Ross, PC

(57) ABSTRACT

The present disclosure relates to a machine tool, in particular a grinding machine, and to a method for measuring a workpiece, in particular a workpiece diameter, in a machine tool, in particular a grinding machine, which comprises a workpiece mount, a tool unit, a measuring device and a control device which is connectable to the measuring device and the tool unit, wherein the measuring device is accommodated on the tool unit and comprises at least two measuring probes, wherein in a measuring configuration the at least two measuring probes are spaced apart by a basic spacing which defines a measurement region, wherein the basic spacing is selected to be greater than a known reference dimension, wherein the control device is configured for acquiring values detected by way of the at least two measuring probes, of detecting an actual position of the tool unit, and, on the basis of a displacement path of the tool unit when probing a workpiece which is moved into the measurement region, of determining an actual spacing, in particular an actual diameter, with consideration to the reference dimension and/or the basic spacing.

17 Claims, 7 Drawing Sheets

(51) Int. Cl.
*B24B 49/10* (2006.01)
*B24B 19/12* (2006.01)
*B24B 49/03* (2006.01)
*B23Q 17/20* (2006.01)
*B24B 5/04* (2006.01)
*B24B 5/42* (2006.01)
*G01B 21/12* (2006.01)
*G01B 3/30* (2006.01)
*B23Q 17/22* (2006.01)

(52) U.S. Cl.
CPC ............... *B24B 5/42* (2013.01); *B24B 19/125* (2013.01); *B24B 49/03* (2013.01); *B24B 49/10* (2013.01); *G01B 3/30* (2013.01); *G01B 21/12* (2013.01)

(56) References Cited

U.S. PATENT DOCUMENTS

| | | | | |
|---|---|---|---|---|
| 5,251,405 A | * | 10/1993 | Clauss | B24B 19/125 451/25 |
| 5,761,821 A | * | 6/1998 | Laycock | B23Q 17/20 33/501.05 |
| 5,857,895 A | | 1/1999 | Falchieri | |
| 6,088,924 A | | 7/2000 | Esteve | |
| 6,159,074 A | * | 12/2000 | Kube | B24B 5/00 33/549 |
| 7,690,967 B2 | * | 4/2010 | Makiuchi | B24B 5/04 451/11 |
| 2004/0055172 A1 | | 3/2004 | Danielli | |
| 2004/0215414 A1 | | 10/2004 | Kaisser | |
| 2011/0119943 A1 | | 5/2011 | Arnold | |
| 2015/0285609 A1 | * | 10/2015 | Ito | G01B 5/016 33/503 |

FOREIGN PATENT DOCUMENTS

| | | |
|---|---|---|
| DE | 10030087 | 1/2002 |
| DE | 69809667 T2 | 4/2003 |
| DE | 19616663 B4 | 1/2005 |
| DE | 60204439 T2 | 5/2006 |
| DE | 102009042252 | 4/2011 |
| EP | 2298497 | 3/2011 |
| GB | 2163981 | 3/1986 |
| GB | 2329472 | 3/1999 |
| JP | S62-255066 | 11/1987 |
| JP | 10-511317 | 11/1998 |
| JP | 2002-120147 | 4/2002 |
| JP | 2003-094293 | 4/2003 |
| JP | 2006-029865 | 2/2006 |
| JP | 2008-279542 | 11/2008 |
| WO | WO 97/13614 | 4/1997 |

OTHER PUBLICATIONS

International Preliminary Report on Patentability (Including Translation) for corresponding International Application No. PCT/EP2012/068947, mailed Apr. 1, 2014.

* cited by examiner

MACHINE TOOL FOR MEASURING A WORKPIECE

CROSSREFERENCES TO RELATED APPLICATIONS

This application is a continuation of International Patent Application PCT/EP2012/0068947, filed on Sep. 26, 2012 designating the U.S., which international patent application has been published in German language and claims priority from German patent application 10 2011 115 254.0, filed on Sep. 27, 2011. The entire contents of these priority applications are fully incorporated by reference herewith.

BACKGROUND OF THE INVENTION

The present disclosure relates to a machine tool, in particular a grinding machine, comprising a workpiece mount, a tool unit, a measuring device and comprising a control device which is connectable to the measuring device and the tool unit. The present disclosure also relates to a method for measuring a workpiece, in particular a workpiece diameter, in a machine tool, in particular a grinding machine.

Machine tools, in particular grinding machines, are known in the prior art. Thus, for example, cylindrical grinding machines can comprise rotationally symmetrical tools, for instance grinding wheels, which can interact in a suitable manner with a workpiece for removing material. Cylindrical grinding machines can be configured, for example, for external cylindrical grinding, internal cylindrical grinding or plunge-cut grinding or angular plunge-cut grinding. As well as grinding wheels, abrasive belts can also be used in principle for cylindrical grinding. As well as rotationally symmetrical faces, eccentrically shaped workpiece faces, for instance, can also be machined when the workpiece mount and the tool unit are drivable in a suitable manner and movable in relation to one another. For instance, camshafts, crankshafts or similar workpieces with eccentric geometries can be machined or ground in this way.

A workpiece to be machined can be accommodated, for instance, between two centers of a workpiece mount or, however, on one side in a workpiece mount. Also known is so-called centerless grinding where the workpiece is not accommodated between centers in the grinding machine, but can be accommodated and guided, for instance, by means of bearing rails, regulating wheels, guide rollers or the like.

DE 10 2009 042 252 A1 discloses a grinding machine which has a measuring apparatus which is configured for in-process measuring of test items during a machining operation. For this purpose the measuring apparatus has a measuring head which is connected to a basic body of the measuring apparatus so as to be pivotable by means of a linkage. The measuring head has an extendible measuring probe which is coupled to a measuring prism and is provided to determine the diameter or the roundness of the test item. The linkage is configured for being able to complete movements of the test item over a certain region, for example a rotation of a crankshaft journal of a crankshaft about the rotational axis thereof.

In-process measuring can be effected, in this way in principle even in the case of grinding eccentrically arranged cylindrical faces, at least section by section. This can be effected at the same time as the grinding. However, the measuring apparatus has a complex design. The linkage is developed in a costly manner and is expensive to control in operation.

So-called in-process measuring, that is, measuring during a machining operation, can allow for highly precise machining operations and can contribute to increasing the quality of manufacture and the process reliability. For this purpose, however, it is regularly necessary to provide for each workpiece measurement to be measured, that is, for instance for each diameter, a measuring head which is matched precisely to the expected measurement. This can be a single-purpose measuring head, for instance, or however, a measuring head on which, for instance, two measuring probes are adjustably accommodated which are at a spacing from one another which corresponds to the expected spacing. The measuring probes are each to be adapted and correspondingly aligned in a highly precise manner to the measurement to be tested.

Such an in-process measuring head is shown, for instance, in DE 196 16 353 A1. Expensive setting-up, adjusting or calibrating processes, which are necessary in order to adapt the measuring head for the respective purpose, can be disadvantageous in this case. In particular in the case of single unit machining, with small batches and medium batches, the setting-up of the measuring head can result in not insignificant expenditure of time and money.

Against this background, it must already be stated that the measuring apparatus known from DE 10 2009 042 252 A1 is sometimes not able to meet the measuring accuracies necessary for an in-process measurement. The associated measuring head has a measuring probe and a measuring prism which are coupled to an absolute measurement reference by means of a plurality of linkage elements of the linkage. All deviations along the path of individual elements of the kinematic chain of the linkage can influence the position of the measuring head in relation to the test item. This can be disadvantageous in particular in the case of section by section measuring of eccentric workpieces. The position of the measuring head in relation to the test item, for instance in relation to the angular position thereof, can contain errors.

SUMMARY OF THE INVENTION

In view of this it is a first object of the present disclosure to present a machine tool, in particular a grinding machine, where with a small amount of expenditure a highly precise and highly flexible measuring of workpieces is enabled.

It is another object of the present disclosure to provide for a machine tool wherein measuring can be carried out in a particularly variable manner with only one measuring configuration.

It is still another object of the present disclosure, to present a method for measuring a workpiece, in particular a workpiece diameter, which can be carried out, for instance, using the machine tool of the present disclosure. Furthermore, a corresponding computer program, particularly a machine tool control program, for carrying out the method is to be presented.

These and other objects of the invention are achieved by a machine tool, in particular a grinding machine, comprising:

a workpiece mount with at least one workpiece holder for accommodating a workpiece, a tool unit with a tool spindle, in particular with a grinding head, for accommodating and for driving a tool, in particular at least one grinding wheel, wherein the tool unit is movable along a feed axis towards the workpiece, a measuring device which is accommodated on the tool unit, wherein the measuring device comprises at least two measuring probes, wherein in the measuring configuration the at least two measuring probes are spaced apart by a basic spacing which defines a measurement region, wherein the basic spacing is selected to be greater than a known reference dimension, and a control device which is connectable to the measuring device and the tool unit, wherein the control device is configured for acquiring values detected by way of the at least two measuring probes, of detecting an actual position of the tool unit along the feed axis, and, on the basis of a displacement path of the tool unit when probing a workpiece which is moved into the measurement region, of determining an actual spacing, in particular an actual diameter, with the at least two measuring probes, with consideration to the reference dimension and/or the basic spacing.

As presented in the present disclosure, the measuring head, in comparison to the expected measurement of the workpiece to be measured, comprises namely an "oversize" which is compensated for, however, during measuring. For instance, when measuring a diameter of the workpiece, first of all a first measuring probe of the at least two measuring probes is moved by means of a movement of the tool unit, on which the measuring device is accommodated, along the feed axis until a measurement can be effected. The workpiece is then probed by a second measuring probe of the at least two measuring probes for instance on the opposite side by the tool unit being moved in a corresponding manner along the feed axis.

The displacement path of the tool unit can be determined during said double probing. The actual spacing can be determined in a simple manner proceeding from the basic spacing which is determined by using the known reference dimension.

In this way, the machine tool is configured in a particularly advantageous manner for the purpose of carrying out a measurement, which can combine elements of an absolute measurement and of a relative measurement. Inaccuracies on the machine-side, for instance deformations as a result of a rise in temperature in operation or the like, can only influence the measuring result regularly by means of the relative spacing between the two absolute actual positions of the tool unit along the feed axis during probing. The measurement can be effected in a low-error manner.

Machine-side influence factors cannot influence the measuring head itself, in particular the basic spacing between the at least two measuring probes, in a notable manner. In comparison with the in-process measurement, where the measuring head has to be adjusted in a highly precise manner to the expected measurement, flexibility is clearly increased. In this way, a high quality of manufacture can be ensured at a low cost for instance even in the case of single unit machining, small batches or medium batches. In particular in the case of these types of applications, the time necessary for measuring in which, for instance, the grinding wheel cannot engage, is not very significant.

Needless to say, the capability to detect the actual positions can be utilized for determining the displacement path. The displacement path can correspond to the spacing between two actual positions of the tool unit along the feed axis during probing. The actual positions can be detected in an absolute manner or a relative manner.

Known absolute measuring heads, as a rule, have at least two complex measuring cells, one probe being associated with each of them. Due to the design, the probes are arranged so as to be movable and, for example, in the manner of scissors or, however, as portions which are movable toward one another and are arranged substantially parallel to one another. Consequently, as a rule, absolute measuring heads are developed in a very expensive manner. Weight and installation size are considerable. As a result of high investment costs, absolute measuring heads are rejected as measuring means for a plurality of applications. The complex design of an absolute measuring head, where the measuring probes are arranged so as to be movable toward one another, frequently goes hand in hand with a reduction in measuring accuracy. These types of measuring heads can only be realized at high costs as a result of their complex design.

In contrast, the combination of the measuring head with the at least two measuring probes, which in the measuring configuration are spaced apart by a fixed basic spacing, and the movable tool unit—already provided—results in higher measuring accuracies with clearly lower expenditure on construction and costs. As already mentioned, a deviation on the machine side, for instance the so-called thermal procedure, can only influence the measuring result by means of a small relative value, namely the difference between two actual position of the tool unit. Calibration of the measuring device by way of the known reference dimension can result in a large proportion of the basic spacing having some influence on the determining of the same as it were in an error-free or low-error manner.

In the case of known in-process measuring heads, own measuring means, for instance in each case an own measuring head, have to be prepared for instance whenever a plurality of diameters on the same workpiece are to be ground in one clamping device.

The measuring head with "oversize" can make it possible to test each of said diameters during manufacture without the workpiece having to be unclamped. Clearly reduced investment expenditure and expenditure on installation space with almost identical accuracies can be produced in this context too.

Needless to say, the term "move into" can be understood in a relative manner. Moving the workpiece into the measurement region between the at least two measuring probes of the measuring device can also be effected, for instance, by the measuring probes being moved toward the workpiece.

The at least two measuring probes can be configured, for instance, as tactile measuring probes or, however, as measuring probes which measure in a contactless manner.

As presented in a further development of the present disclosure, the measuring device comprises a measuring head on which the at least two measuring probes are accommodated, wherein the measuring head is pivotable in order to move the workpiece into the measurement region.

In this way, the measuring head can be moved towards the workpiece by means of a simple pivoting movement in order to be able to carry out the probings. This can be effected, for instance, by means of a linear drive, for example a hydraulic cylinder. The pivotability can prevent collisions which, for example, can be caused by moving the tool unit during a grinding operation.

No further separate drive devices are necessary to the measuring device in a regular manner apart from such a pivoting apparatus.

The measuring head can be developed, for instance, in a U-shaped manner. The first and the second measuring probe, in this case, can form the portions of the U. The interior space of the U can determine the measuring area.

As presented in a further aspect of the present disclosure, the measuring device comprises a coupling linkage mechanism which allows for pivoting between a measurement position and an out-of-engagement position.

A coupling linkage mechanism can be configured in a particularly space-saving manner. Two end positions can be defined by the coupling linkage mechanism, namely for instance the measurement position and the out-of-engagement position. In particular, the measurement position can be changed with a high level of reproducibility through structural measures, such as stops or the like.

When the measurement position and the out-of-engagement position are defined for instance by mechanical measures in the case of the coupling linkage mechanism, a simple drive element or adjusting element can be selected to drive the measuring device. Expensive control devices for the coupling linkage mechanism can be avoided in this manner.

As an alternative, for instance pivot joints with a defined pivoting region or for instance pivot arms coupled to controllable motors can be provided in place of a coupling linkage mechanism. It can be advantageous when the motors have a high level of positioning accuracy.

As claimed in a further development, the basic spacing and the actual spacing are at a ratio of approximately a maximum of 2:1, preferably a maximum of 1.5:1, further preferred a maximum of 1.2:1 and even further preferred a maximum of 1.1:1.

The smaller the ratio between the basic spacing and the actual spacing, the less the machine-side influences influence the determining of the actual spacing.

In contrast, greater flexibility of the measuring device can be produced where the ratio between the basic spacing and the actual spacing is large. The measuring head can be suitable for a plurality of actual spacings, in particular actual diameters. Machine-side influences are essentially only brought to bear by means of the displacement path which, for instance, corresponds to the difference between the basic spacing and the actual spacing.

The basic spacing can be determined by moving the tool unit along the feed axis and on both sides probing the reference dimension accommodated in the tool mount with consideration to the displacement path of the tool unit.

Where the ratio between the basic spacing and the reference spacing is small, a high level of accuracy can be ensured when determining the basic spacing. Highest levels of accuracy can be achieved when the reference dimension almost corresponds to the basic spacing, that is to say is only insignificantly smaller.

As claimed in a further development, at least one measuring probe of the at least two measuring probes is deflectable in a proportionality region, wherein the control device is configured for detecting the deflection of the at least one measuring probe.

For this purpose, the at least one measuring probe can be provided with a displacement transducer for detecting the deflection. Displacement transducers can be configured, for instance, as inductive displacement transducers, capacitive displacement transducers or as potentiometer transducers. Other principles for detecting the deflection are conceivable. The deflection can also be detected for instance by means of strain gauges. Piezo elements could also be used.

Deflectable measuring probes regularly allow for highly precise position detection at least in the proportionality region.

The deflection of the at least one measuring probe can be taken into consideration when determining the actual spacing. For instance, absolute machine influences can be recognized and compensated for in this way when moving the tool unit for probing the tool. The displacement path of the tool unit can be corrected with the knowledge of the deflection of the at least one measuring probe.

As claimed in a further development of the present disclosure, the workpiece is mountable on a workpiece spindle which is rotationally driveable in a selective manner about a workpiece spindle axis, wherein the workpiece spindle axis is preferably arranged perpendicular with respect to the feed axis, and wherein the tool spindle preferably comprises a tool spindle axis which is arranged parallel to the workpiece spindle axis.

A workpiece spindle developed in such a manner can also be designated, for instance, as a C-axis. A controllable C-axis can allow for targeted measuring of actual spacings at different positions along the periphery of the workpiece.

The region of application of the measuring device can be extended when using at least one deflectable measuring probe. For instance, circularity errors of the workpiece can be detected in particular in combination with the workpiece spindle which is selectively drivable about its workpiece spindle axis, that is, the C-axis. For instance, form tolerances can also be controlled in this manner.

As claimed in a further development, the tool unit is movable in relation to the workpiece parallel to the workpiece spindle axis.

Actual spacings can be determined in this way at a plurality of different axial positions of the accommodated workpiece.

As claimed in a further aspect, the control device is configured for moving the tool unit in a selective manner along the feed axis with a coupled movement and of driving the workpiece spindle in a selective manner about the workpiece spindle axis.

A coupled movement of this type allows for the detection of eccentric geometries, for example of crank pins of a crankshaft or cam faces of a camshaft, or further circularity errors.

It is conceivable to detect the respective actual spacings by probing on both sides with two measuring probes along certain positions of the rotating eccentric workpiece. In addition or as an alternative to this, over and above this, surface inaccuracies can be detected for instance with an deflectable measuring probe if the tool unit is moved in such a manner that the measuring probe comes to abut against the workpiece at least in sections when said workpiece rotates.

As claimed in a further aspect, the control device is configured for further moving the tool unit in a selective manner parallel to the workpiece spindle axis with a coupled movement.

Consequently, for instance along with circularity tolerances which are restricted, for instance, to an axial position of the workpiece, deviations in the cylindrical form can also be determined. For this purpose, during measuring the tool unit can be moved with the measuring device axially along the workpiece. The probing can be effected on the workpiece, for example, along a spiral path.

The tool unit can comprise, for instance, a cross-table or can be accommodated on a cross-table which provides guide means for the feed axis and the movement in relation to the workpiece spindle axis (for example parallel). However, needless to say, the tool unit can also be developed or guided in a different manner. In principle, for instance a cross-table with two guide means could be dispensed with. The tool unit could be accommodated, for instance, on a guide means for the feed axis. A movement of the tool unit parallel to the workpiece spindle axis, in this case, can, in principle, also be brought about by a movement of the accommodated workpiece in relation to the tool unit. Further developments are conceivable.

As claimed in a further aspect of the present disclosure, the control device is configured for moving the tool unit with the measuring device in a selective manner with a rapid motion or a probing motion.

In this way, an optimum can be maintained between saving time by increasing the traveling speed and operational reliability. With the probing motion, for instance crawling motion, the tool unit can be stopped abruptly. This can also be effected, for instance, whenever the measuring head signals that at least one of the at least two measuring probes is probing the workpiece at a certain probing force. Feed movements where no collisions are to be feared can be effected, in contrast, at high accelerations or speeds.

As claimed in a further development, the control device is configured for selectively driving and displacing the tool unit and the tool under consideration of the actual spacing of the workpiece, in particular the actual diameter, in a subsequent machining process.

In this way, for instance during the course of the measuring of the workpiece, a correction value can be determined which is to underlie a subsequent phase of operation. In this way, the workpiece can be brought in a reliable manner, for instance bit by bit, to the necessary end dimensions by means of mutual measuring and correcting. The control device can feed the tool unit in a targeted manner and drive the tool in a defined manner on the basis of the correction value.

As claimed in a further aspect, the control device is coupled with a position transducer of the tool unit, by means of which the actual position of the tool unit can be detected.

The position transducer can be coupled, for instance, with an incremental or absolute measurement standard which allows for highly precise detecting of the actual position of the tool unit on the feed axis. The comparison between different actual positions of the tool unit allows for highly precise determining of the displacement path.

The object of the present disclosure is also achieved by a method for measuring a workpiece, in particular a workpiece diameter, in a machine tool, in particular a grinding machine, said method comprising the following steps:

preparing a measuring device which is movable in relation to a workpiece along a feed axis, wherein the measuring device is preferably accommodated on a tool unit, wherein the measuring device comprises at least two measuring probes, adjusting a basic spacing between the at least two measuring probes which is selected to be greater than a known reference dimension of a reference geometry and defines a measurement region, accommodating the reference geometry in the machine tool, bringing the reference dimension into the measurement region, moving the measuring device in relation to the reference geometry and probing the reference dimension with the measuring probes, at the same time detecting the actual positions of the measuring device, consequently detecting the displacement path of the measuring device, and determining the basic spacing with consideration to the reference dimension and the actual positions of the measuring device when probing.

Needless to say here too that the step of bringing-in can be effected by a relative movement between the reference dimension of the reference geometry and the measuring device.

Calibrating or standardizing the measuring device can be carried out in a simple manner using the method. Accordingly, the measuring device with the at least two measuring probes is suitable for measuring a plurality of workpiece geometries as long as they can be brought into the measurement region.

The method can be further developed by the following steps:

accommodating a workpiece in the machine tool, bringing a measurement geometry of the workpiece into the measurement region, probing the measuring geometry of the workpiece with the measuring probes, at the same time detecting the displacement path of the measuring device, and determining an actual spacing of the measurement geometry with consideration to the basic spacing and to the displacement path of the measuring device when probing.

After the one-off calibration of the measuring device by way of a known reference dimension, the measuring device can be utilized for a plurality of measuring operations. The measuring can be incorporated, for instance, in a manufacturing sequence which, for example, comprises rough machining, fine machining and finish machining with a workpiece which is clamped once.

Needless to say, the actual positions of the measuring device, which can be used for determining the displacement path of the measuring device, can be understood for instance as absolute positions or, however, as relative positions with reference to a measurement standard. When determining the actual spacing, the displacement path of the measuring device can be determined in a relative manner or an absolute manner.

The method can be carried out in particular with a machine tool as claimed in one of the aforementioned aspects. Needless to say, the method can also be further developed as claimed in one or several aspects of the aforementioned machine tool.

Furthermore, a tool control program is presented which comprises program code which is configured for causing a control device to carry out the steps of the method as claimed in the aforementioned aspects when the tool control program is executed on the control device.

It goes without saying that features of the invention that have been mentioned hereinbefore and will be described hereinafter can be used not only in the respectively specified combination, but also in other combinations or in isolation without departing from the scope of the invention.

BRIEF DESCRIPTION OF THE DRAWINGS

Further features and advantages of the invention are produced from the following description of several preferred exemplary embodiments with reference to the drawings, in which.

DESCRIPTION OF PREFERRED EMBODIMENTS

Figure 1:
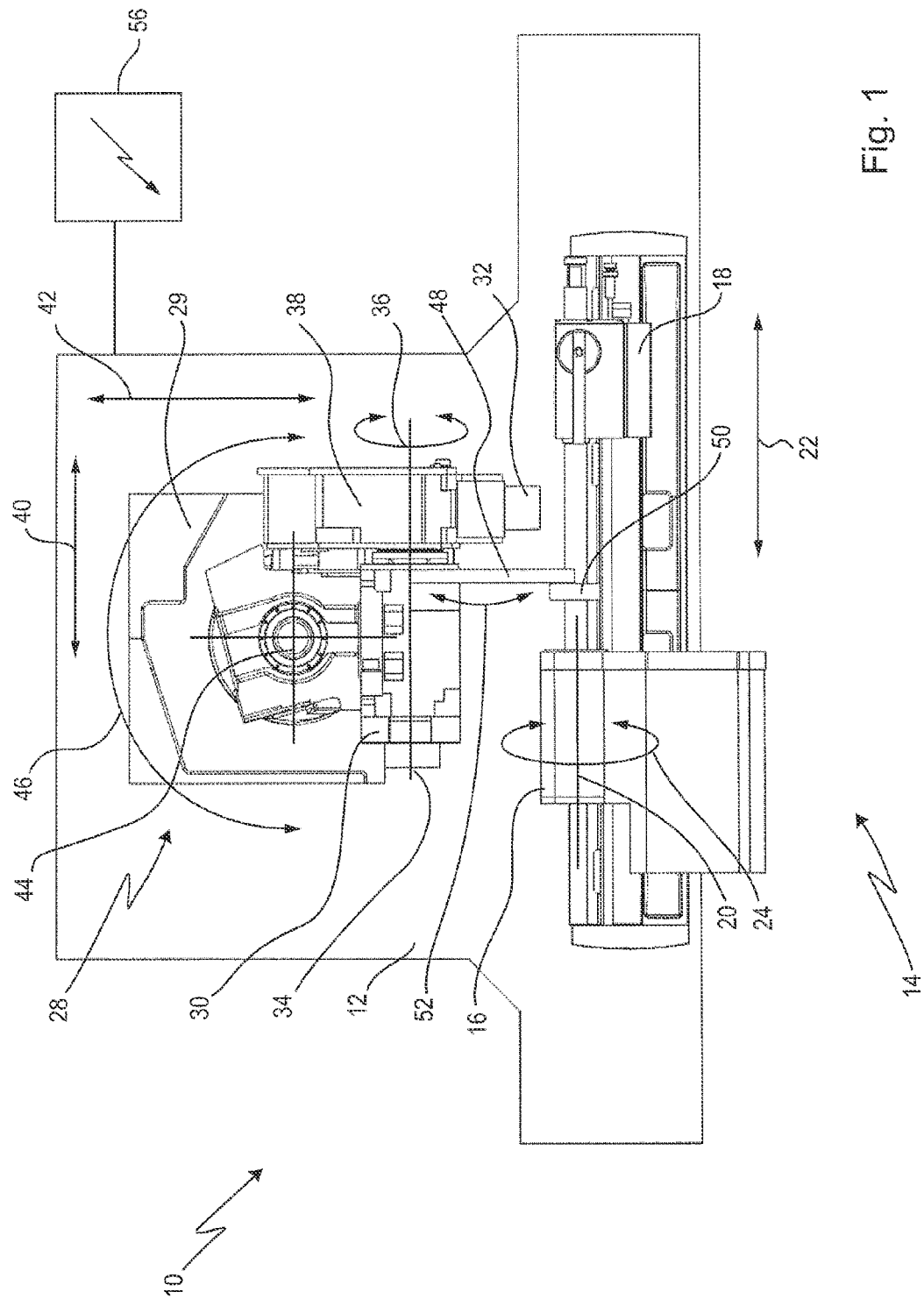
FIG. 1 shows a top view of a machine tool in accordance with the present disclosure.

A machine tool in accordance with the present disclosure is shown in FIG. 1 and is designated overall by the reference 10.

The machine tool 10 is configured in the present case as a grinding machine. The machine tool 10 comprises a support table 12 which can be arranged, for instance, as part of a framework. A workpiece mount 14 is mounted and guided on the support table 12. The workpiece mount 14 comprises a workpiece spindle headstock which is provided with a workpiece spindle 16. The workpiece spindle 16 comprises a tailstock 18 associated therewith. A workpiece can be mounted between the workpiece spindle 16 and the tailstock 18 (not shown in FIG. 1).

The workpiece spindle 16 comprises a workpiece spindle axis 20 about which the workpiece is rotationally driveable, where applicable, cf. also an arrow designated by the reference 24. The workpiece spindle axis 20 can also be designated as a C-axis. A C-axis can allow for a targeted, controlled rotation of a workpiece which is mounted in the workpiece mount 14. An arrow designated by the reference 22 marks a possible movement along a so-called Z-axis, cf. also FIG. 2. A relative movement between the workpiece and a machining tool can be effected along the Z-axis. To this end, either the workpiece, the tool, or however both of these together can be moved along the Z-axis. The Z-axis lies parallel to the workpiece spindle axis 20 or, however, lies in a congruent manner with respect thereto.

A tool unit 28 is further mounted on the support table 12 of the machine tool 10. The tool unit 28 can comprise a tool table 29. The tool table 29 can be arranged, for instance, as a cross-table. Other developments are conceivable. The tool unit 28 comprises a tool spindle 30 which, in the present case, is arranged, for instance, as a grinding head. A tool 32, in this case for instance a grinding wheel, is mounted on the tool spindle 30. The tool 32 can be set in rotation around a tool spindle axis 34 by means of the tool spindle 30, cf. an arrow marked with the reference 36. The tool 32 is only visible in sections in FIG. 1. The tool unit 28 also comprises a hood 38 which covers a large part of the tool 32.

In particular when the tool unit 28 comprises a tool table 29 in the form of a cross-table, the tool spindle 30 can be moved in relation to the workpiece mount 14 along an arrow marked with the reference 40. The arrow 40 can also be associated with the Z-axis, cf. FIG. 2. In particular whenever the workpiece mount 14 is not provided for longitudinal displacement along the arrow 22 during the machining of the workpiece, the relative movement between the workpiece and the tool 32 can be effected by moving the tool spindle 30 with the tool 32 mounted thereon along the arrow 40.

Figure 2:
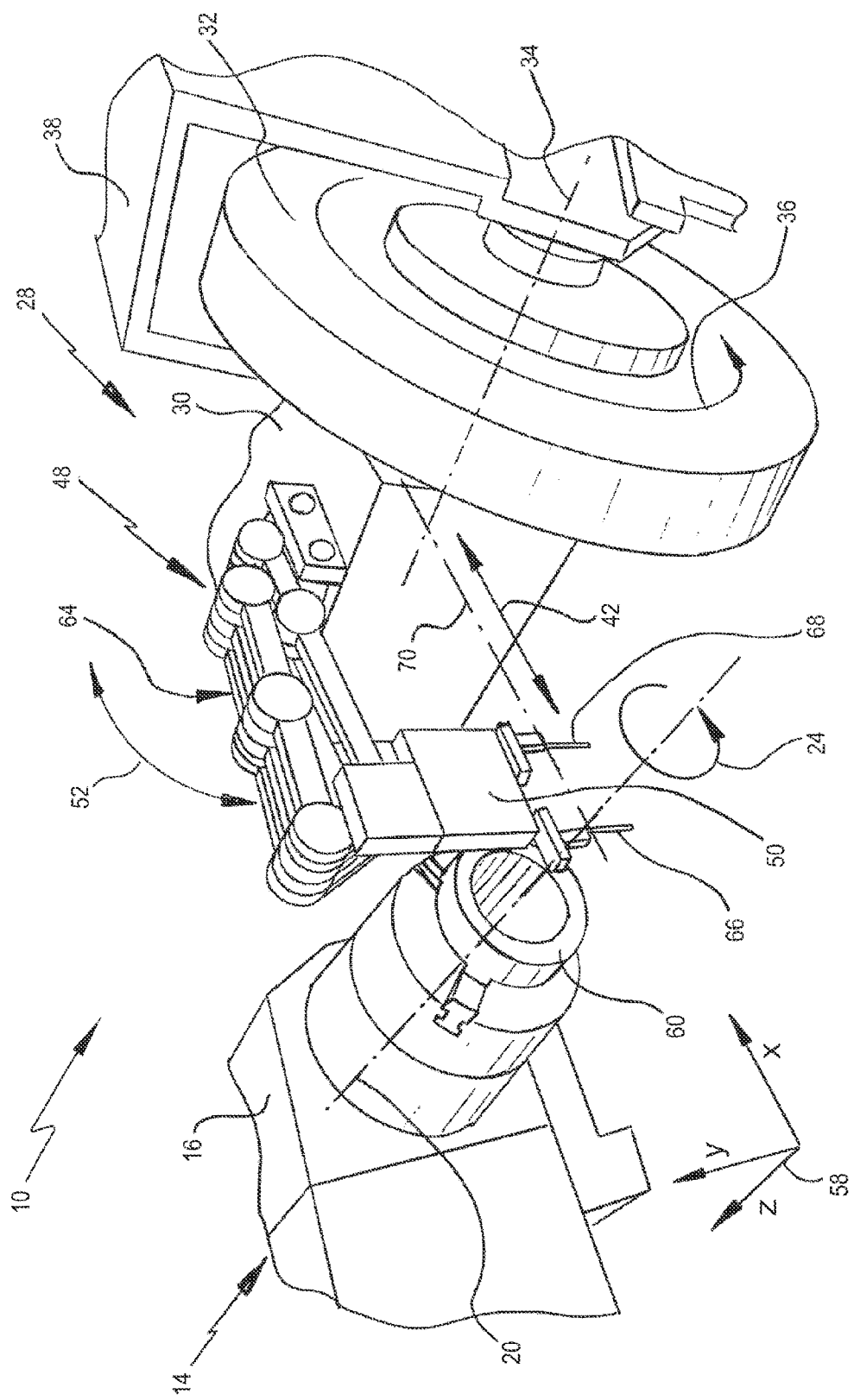
FIG. 2 shows a perspective view of a machine tool in accordance with the present disclosure following FIG. 1.

An arrow given the reference 42 describes a feed direction which can be associated with an X-axis, cf. once again FIG. 2. The tool 32 can be fed along the X-axis towards the workpiece in order to engage with the same. The X-axis can also be designated as the feed axis, cf. the feed axis 70 in FIG. 2. The movement along the X-axis or feed axis 70 can be guided for instance by suitable guide means of the support table 29 and/or of the support table 12.

As an example, the tool unit 28 in FIG. 1 also comprises a B-axis 44. In the representation according to FIG. 1, the B-axis 44 runs at right angles to the plane of projection. The B-axis 44 enables the tool spindle 30 to pivot, cf. a pivot arrow given the reference 46. The B-axis 44 can make it possible to provide a plurality of tool spindles 30 with tools 32 on the tool unit 28. These can be transferred into a machining position where required by pivoting the B-axis 44. Flexible machining, for instance with tools 32 with different abrasive materials can be made possible in this way. Consequently, different grinding wheels for rough machining, fine machining or finish machining for instance can be engaged with the workpiece without any particular structural expenditure. The association between the B-axis 44 and the Z-axis, cf. the arrows 22 and 40, or the X-axis, cf. the arrow 42, can also be developed differently to in FIG. 1. As an example, the B-axis 44 could also be arranged as an alternative to this parallel to the workpiece spindle axis 20 or to the tool spindle axis 34. In the case of such a development, a further tool, for instance, could be mounted on an extension arm which is mounted on the tool spindle 30 and is pivotable for pivoting-in the further tool about the tool spindle axis 34 towards the workpiece (not shown in FIG. 1).

Needless to say, the machine tool 10 can also be arranged without the B-axis 44, in particular whenever only one tool spindle 30 is provided.

A measuring device 48 is mounted on the tool spindle 30, cf. also FIG. 2. The measuring device 48 comprises a measuring head 50. An arrow given the reference 52 indicates that the measuring device 48 with the measuring head 50 is mounted so as to be pivotable on the tool spindle 30.

The machine tool 10 also comprises a control device 56 which can be configured in particular for the purpose of actuating the workpiece mount 14 with the workpiece spindle 16, the tool unit 28 with the tool spindle 30, the tool 32 and, where applicable, the B-axis 44 or the workpiece spindle axis 20 in a targeted manner for the drive thereof or for the displacement thereof. Movements, in this case, can be effected, for instance, along the X-axis or the Z-axis. In addition, the control device 56 can also be configured for receiving in a supplied manner operating parameters, for instance position parameters, from components of the machine tool 10. The control device 56 can comprise, for instance, a detection unit, an evaluation unit and a control unit.

A coordinate system 58 is shown in FIG. 2 to illustrate the axes X, Y and Z of the machine tool 10. Needless to say, the named axes and directions serve purely for illustration purposes and not for the purpose of restricting the object of the disclosure. It further goes without saying that movements of components of the machine tool 10 toward one another can be effected in principle in a relative manner. This means that if, for instance, a first element is to be movable in relation to a second element, either the first element or the second element can perform the movement. It is equally conceivable for both elements to be moved together.

In FIG. 2 a workpiece clamping device 60, which can be arranged, for instance, as a clamping chuck, is mounted on the tool spindle 16 of the workpiece mount 14. For illustration purposes the representation of different components of the machine tool 10 comprises been dispensed with in FIG. 2. As an example, no tailstock 18 is shown. Needless to say, that, for instance, precisely in the case of short workpieces, one-sided accommodation on the workpiece clamping device 60 can be sufficient. In contrast, for instance particularly long and/or thin-walled workpieces can be further supported by means of at least one interposed steady rest (not shown), for instance along with the workpiece spindle 16 and the tailstock 18, cf. FIG. 1.

The measuring device 48 comprises a pivoting-in mechanism which can be arranged, for instance, as coupling linkage mechanism 64. The measuring device 48 is mounted on the tool spindle 30 and can be moved along the feed axis 70 together with said tool spindle. The feed axis 70 can correspond to the X-axis or can be arranged parallel to said axis. The arrow 42 indicates the associated movement back and forth.

The measuring device 48 is situated in the measurement position in FIG. 2. In the measurement position the measuring head 50, which comprises a first measuring probe 66 and a second measuring probe 68, is moved or pivoted into the region of the workpiece spindle axis 20.

Figure 3A:
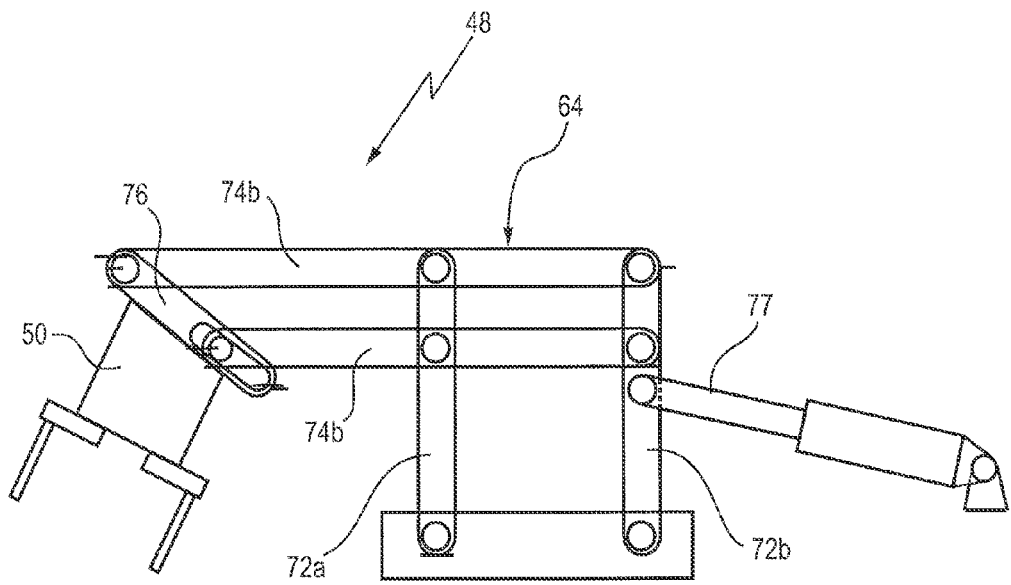
FIGS. 3a, 3b show side views of a measuring device for use with the machine tool according to FIG. 2 in an out-of-engagement position and a measurement position.
Figure 3B:
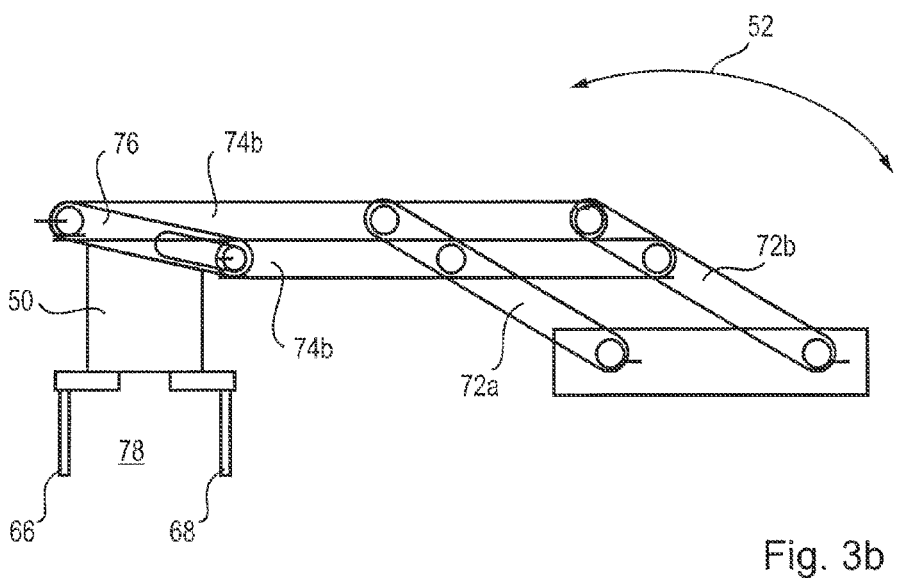

An exemplary design of the measuring device 48 is explained in FIGS. 3a and 3b. The measuring device 48 comprises a pivoting mechanism which is embodied by the coupling linkage mechanism 64. The coupling linkage mechanism 64 is arranged in the present case, for instance, as a double rocker. Other mechanisms to achieve the pivoting-in functionality of the measuring device 48 are conceivable.

The coupling linkage mechanism 64 comprises two coupling members 72a, 72b which are arranged, for instance, as rockers. The rockers 72a, 72b are mounted so as to be rotatable on the tool spindle 30, cf. also FIG. 2. The rockers 72a, 72b are connected in each case to coupling members 74a, 74b which are developed, for instance, as connecting rods. In the case of the length ratios illustrated in FIGS. 3a and 3b, a parallel guiding means with respect to one another can be produced both for the rockers 72a, 72b and for the connecting rods 74a, 74b when pivoting, cf. the arrow 52. Other length ratios are easily conceivable.

The connecting rods 74a, 74b are connected to an extension arm 76 in their front region. The extension arm 76 is linked to the connecting rod 74a for instance by means of a pivot joint. The connecting rod 74b is connected to the extension arm 76 for instance by means of a longitudinal groove.

The coupling linkage mechanism 64 can be developed, for instance, for the purpose of meeting certain admissible installation space conditions. Installation space advantages can be produced in particular in comparison with a pure pivot arm. Needless to say, however, that the pivoting of the measuring device 48 can also be effected in another manner.

An adjusting cylinder 77, which is coupled with the rocker 72b, is shown in FIG. 3a. When the adjusting cylinder 77 is extended, the coupling linkage mechanism 64 can be pivoted. Other drive means for the pivoting are conceivable.

The representation shown in FIG. 3b can correspond, for instance, to the measurement position according to FIG. 2. In contrast FIG. 3a illustrates, for instance, an out-of-engagement position of the measuring device 48. In the measurement position according to FIG. 3b, the measuring head 50 with the first measuring probe 66 and the second measuring probe 68 can surround a workpiece for instance in such a manner that reciprocal probing is made possible. The measuring probes 66, 68 define a measurement region 78 which determines, for instance, the maximum size of a workpiece to be measured or of a portion of the workpiece to be measured.

Figure 4:
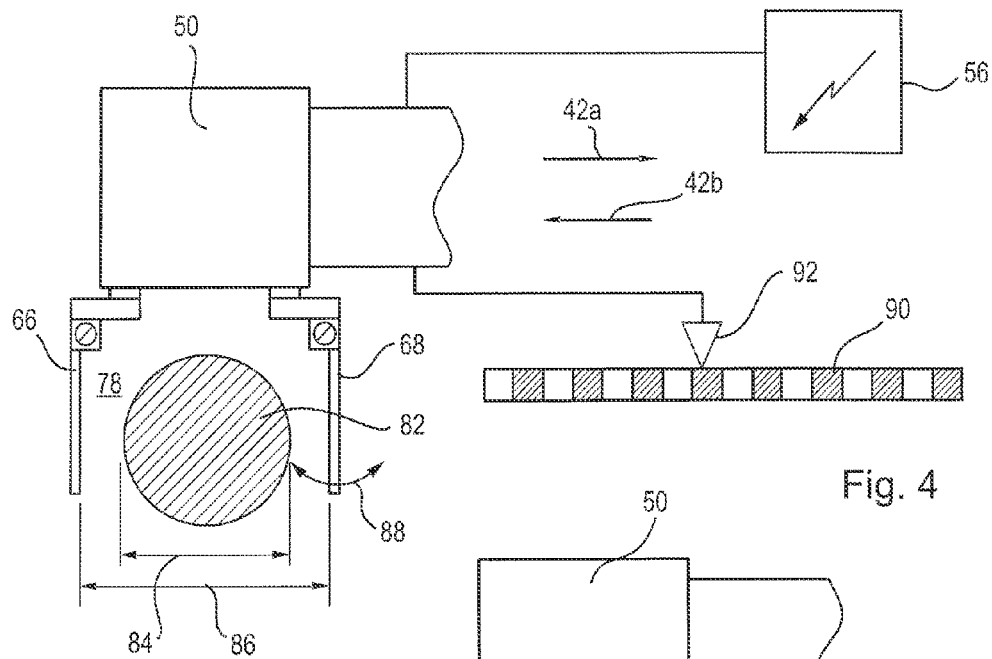
FIG. 4 shows a simplified schematic view of a measuring head and of a reference workpiece.

FIG. 4 shows as an example how the measuring head 50 of the measuring device 48 with the measuring probes 66, 68 can be calibrated prior to measuring. For this purpose, a known reference geometry 82, for instance a reference workpiece, is introduced into the measurement region 78. The reference workpiece with the reference geometry 82 can be mounted, for instance, in the workpiece mount 14 of the machine tool 10. The moving into the measurement region 78 can be effected, for instance, by the pivoting of the measuring device 48.

The reference geometry 82 of the reference workpiece comprises a known reference dimension 84. For calibrating or for standardizing the measuring head 50, the reference dimension 84 or the reference geometry 82 is laterally probed in a mutual manner with the first measuring probe 66 or the second measuring probe 68. The associated movements of the tool spindle 30, cf. FIG. 2, are indicated by the arrows 42a and 42b. As an example, the measuring head 50 is linked by means of the pivoting-in mechanism 64 and the tool spindle 30 to a position transducer 92 and a measurement standard 90, which describes, for instance, an actual position of the tool unit 28 along the feed axis 70.

In this way, associated actual positions can be detected when probing the reference geometry 82 respectively with the first measuring probe 66 and the second measuring probe 68. A basic spacing 86 can be determined in a simple manner from the spacing between said actual positions and the known reference dimension 84. The basic spacing 86 can serve as a basis for all subsequent measurements on workpieces. The positional data acquired by the position transducer 92 can be supplied, for instance, to the control device 56 for evaluation. The position can be detected in another manner. The position transducer 92 can be arranged, for instance, as an incremental transducer or as an absolute transducer. In addition, optical, inductive, capacitive or magnetic measuring principles can be utilized for instance.

An arrow given the reference 88 in FIG. 4 additionally indicates that, for instance, the second measuring probe 68 can be configured so as to be deflectable by a certain amount. Such a deflection of the measuring probe 68 can also be detected and supplied to the control device 56. The first measuring probe 66 can be developed in the same manner. When probing the reference geometry 82 within the framework of the calibrating operation, for instance the first measuring probe 66 and the second measuring probe 68 can be calibrated in their neutral position, that is, without any considerable deflection. For this purpose, the actual position of the tool spindle 30 along the feed axis 70, for instance, can be varied until the position signal output in each case by the measuring probes 66, 68 is, for instance, zero. In such a neutral position, for instance so-called measuring circuits of the first and second measuring probe 66, 68 can be set to zero.

In the following measurements, the deflection of the first measuring probe 66 or of the second measuring probe 68 during probing can be taken into consideration in addition to the actual positions of the tool spindle 30 along the feed axis 70 in order to be able to determine exact spacings.

Figure 5A:
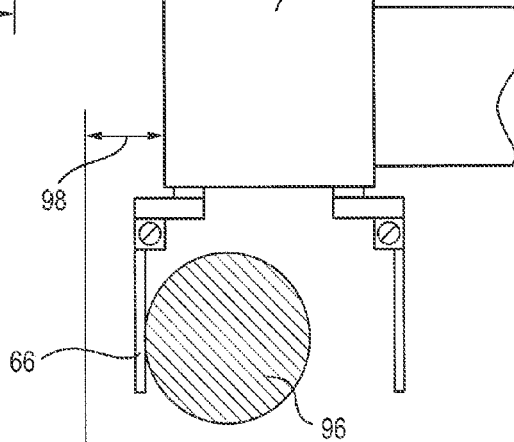
FIGS. 5a, 5b show different positions of the measuring head according to FIG. 4 when probing a workpiece.
Figure 5B:
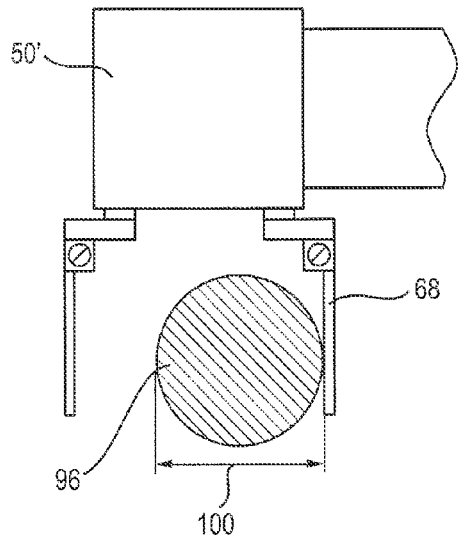

FIGS. 5a and 5b show as an example the determining of a diameter of a workpiece 96. The first measuring probe 66 of the measuring head 50 abuts against the workpiece 96 in FIG. 5a. Subsequent moving of the tool spindle 30 and consequently also of the measuring head 50 results in the second measuring probe 68 abutting against the workpiece 96 on the opposite side. The displacement path of the tool spindle 30 is illustrated by an arrow given the reference 98. With the knowledge of the basic spacing 86, cf. FIG. 4, and of the displacement path 98, an actual spacing 100, in particular an actual diameter, of the workpiece 96 can be determined in a simple manner.

The deflection of the measuring probe 68 or of the measuring probe 66 indicated by the arrow 88 in FIG. 4 can produce, for instance, correction values which can be taken into consideration when determining the actual spacing 100.

In an alternative manner, during the respective probing of the first or of the second measuring probe 66, 68, the tool spindle 30 can be moved up until the signal output by the measuring probes 66, 68 corresponds, for instance, to a neutral position, that is, a zero deflection or an almost zero deflection.

When determining the actual spacing 100, machine-side influence factors, for instance the thermal procedure of the machine tool 10, can only influence the measuring result, in principle, by means of the small displacement path 98. The "oversize", which corresponds for instance to the difference between the basic spacing 86 and the reference spacing 84, allows for a plurality of different workpieces 96 with different dimensions to be measured.

Figure 6A:
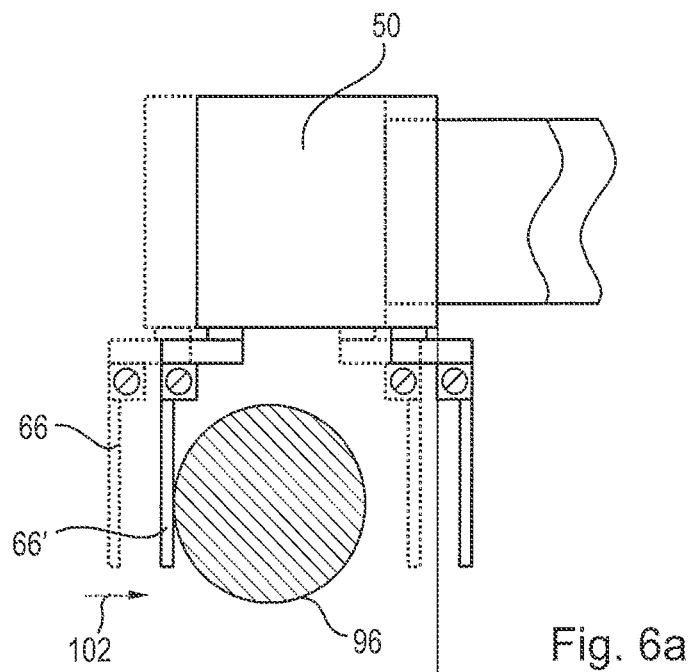
FIGS. 6a, 6b show different positions of the measuring head according to FIG. 4 when probing a workpiece with an actuating means which is modified in relation to FIGS. 5a and 5b.
Figure 6B:
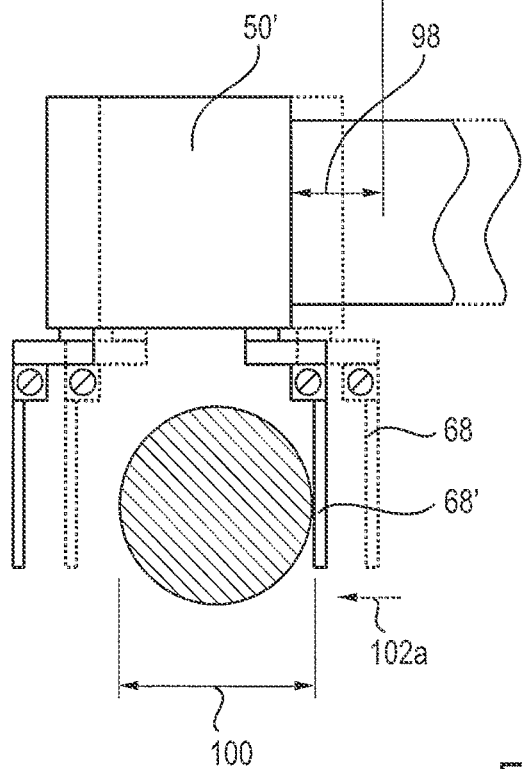

A measuring sequence similar in principle to FIGS. 5*a* and 5*b* is explained in FIGS. 6*a* and 6*b*. The probing of the workpiece 96 is effected, however, at different feed speeds. Thus it can be advantageous, for instance, to supply the measuring probe 66 initially with a rapid motion or fast motion to a preliminary position in which said measuring probe does not yet contact the workpiece 96. To avoid damage to the measuring head 50 or to the workpiece 96, proceeding from the preliminary position, the further feeding can be effected with a probing motion until the measuring probe 66' probes the workpiece 96.

The probing of the measuring probe 68 can be effected in the same way by said measuring probe being supplied first of all to a preliminary position with a rapid motion. Proceeding from the preliminary position, the further feed can be effected with a slow probing motion, cf. an arrow given the reference 102*a*. The measuring probe 68' has probed the workpiece 96.

The actual spacing of the workpiece 96 can be determined proceeding from the displacement path 98 and from the known basic spacing 86.

Figure 7:
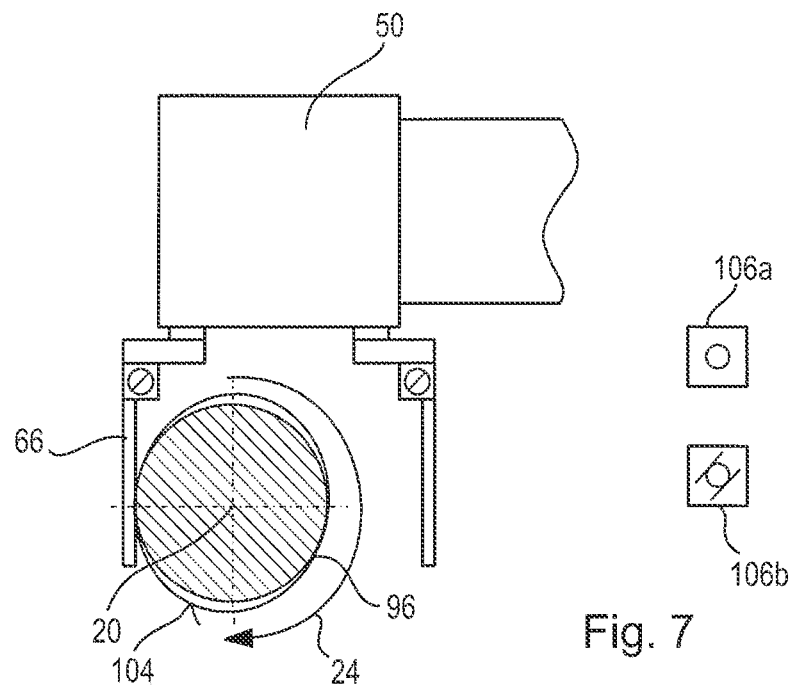
FIG. 7 shows a view of the measuring head according to FIG. 4 when detecting form tolerances of a workpiece.

FIG. 7 illustrates that the measuring head 50 allows for further application possibilities. The workpiece 96 to be tested in FIG. 7 has a form deviation indicated by the reference 104. In this case this can be a circularity deviation for instance or even a deviation in a cylindrical form, cf. tolerance symbols given the reference 106*a*, 106*b* as an example. The measuring probe 66 is deflectable and can consequently detect the form deviation 104 in a continuous or intermittent manner when the workpiece 96 rotates around the workpiece spindle axis 20. In this context it can be preferred when the measuring probe 66 comprises a large proportionality region in order also to be able to detect large deviations.

Cylindrical form tolerances can be detected, for instance, whenever the tool spindle 30, on which the measuring device 48 is mounted, is displaced along the Z-axis parallel to the workpiece spindle axis 20 when the workpiece 96 rotates. As an example, for instance, such a cylindrical face can be probed along a spiral path. The workpiece 96 is able to be "scanned" in this manner.

Figure 8:
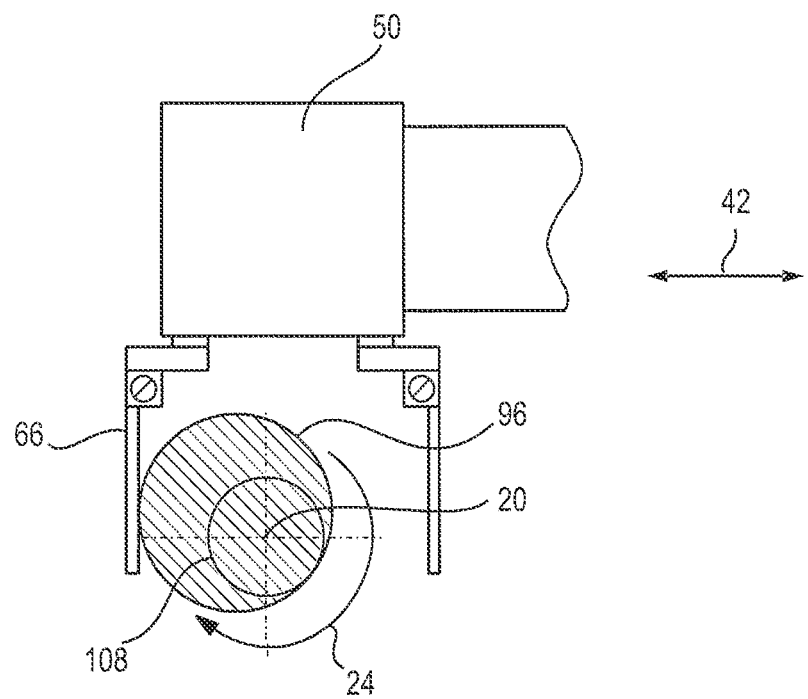
FIG. 8 shows a view of the measuring head according to FIG. 4 when probing a workpiece which rotates in an eccentric manner.

In FIG. 8 the workpiece 96 is developed in such a manner that an eccentric portion around a central portion 108 rotates about the workpiece spindle axis 20. These types of workpieces 96, which are developed eccentrically at least in sections, can be measured for instance whenever the control device 56 is developed for the purpose of driving the tool spindle 30 along the X-axis, that is, the feed axis 70, and at the same time the workpiece 96 about the so-called C-axis which coincides in the present case with the workpiece spindle axis 20. As an example, the coupled movement of expected contact positions of the first measuring probe 66 can be effected on the workpiece 96 when the same rotates in an eccentric manner. Circularity tolerances or cylindrical form tolerances, for instance, can also be detected in principle in this manner. It is, however, conceivable to drive eccentric workpieces 96 section by section and to detect actual spacings, for instance actual diameters, in each case with the two measuring probes 66, 68 in an analogous manner to FIGS. 5*a*, 5*b* or FIGS. 6*a*, 6*b*.

Figure 9:
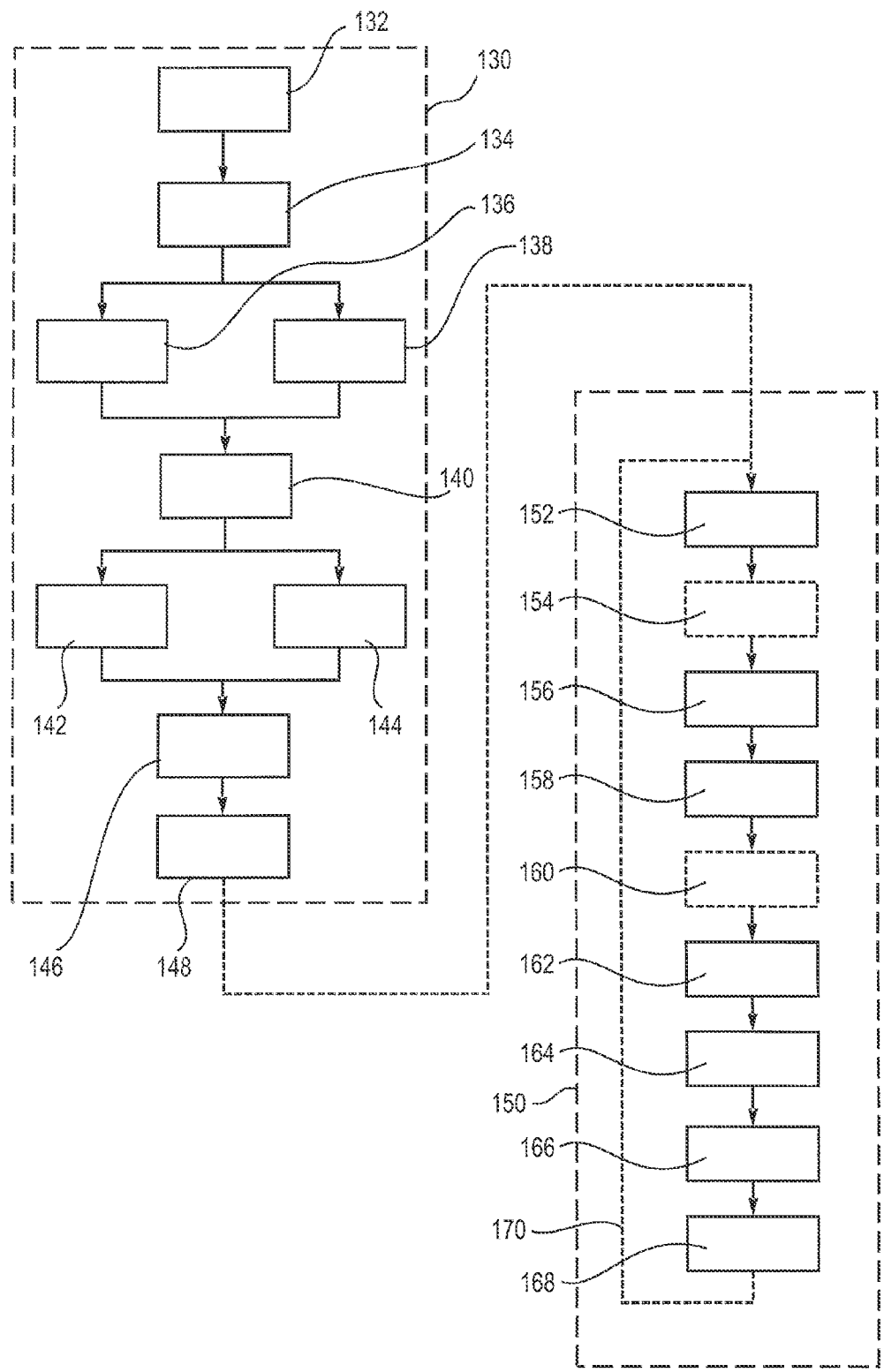
FIG. 9 shows schematic flow diagrams of a method for calibrating a measuring device and a method for measuring a workpiece.

FIG. 9 illustrates different steps of a method for measuring workpieces, said method being able to be carried out for instance with the machine tool 10.

The method can comprise an initial block 130 which can comprise, for instance, calibrating or standardizing.

A reference dimension, for instance a reference body, is prepared and introduced into a measurement region in a first step 132. The introduction can be effected, for instance, by means of pivoting a measuring device.

A first probing of the reference dimension can be effected, for instance, with a first measuring probe in a subsequent step 134. The first probing 134 can be terminated, for instance, by the steps 136 and 138. The step 136 can comprise electrically calibrating a measuring circuit of the first measuring probe. The step 138 can include detecting an actual position along an X-axis or feed axis.

A step 140, which comprises a second probing by means of a second measuring probe, can then follow. The step 140 of the second probing can comprise the steps 142 and 144 which can end the step 140. The step 142 can comprise electrically calibrating a measuring circuit of the second measuring probe. The step 144 can include detecting a second actual position along the feed axis or the X-axis.

In a subsequent step 146, proceeding from the detected values and the known reference dimension, a basic spacing can be determined which can serve as a basis for further measurements. A step 148 ends the calibrating or standardizing.

A block described with the reference 150 describes, as an example, the measuring of a workpiece using the basic spacing determined beforehand.

In a first step 152 a workpiece to be measured is mounted and, for instance, by means of pivoting the measuring device is moved into the measurement region thereof.

A preliminary position can be approached at a first feed speed in an optional step 154. In a further step 156, a first measurement position can be approached in which a first probing of the workpiece is effected with the first measuring probe. The approaching can be effected, for instance, at a second feed speed. In a further step 158, the position values linked to the first probing can be taken up.

In a subsequent optional step 160 downstream, a second preliminary position can be approached at the first feed speed. A subsequent step 162 comprises the approaching of a second measurement position in which the second measuring probe can contact the workpiece 96. The approaching can be effected, for instance, at a second feed speed. In a further step 164, the position values linked to the second probing are taken up.

A step 166, in which, proceeding from the data obtained and the basic spacing, an actual spacing is determined, connects to the first and the second probing. The measuring operation is terminated by a step 168 which can also comprise, for instance, a pivoting-out of the measuring device.

An arrow 170 indicates that a plurality of measurements can be carried out after the one-off calibration. In this case, different actual spacings can be determined insofar as they can be moved into the measurement region.

The described method steps can be an object of a machine tool control program, for instance.

What is claimed is:

1. A grinding machine, comprising:
   a workpiece mount comprising at least one workpiece holder for accommodating a workpiece,
   a tool unit comprising a grinding head provided with a tool spindle for accommodating and for driving at least one grinding wheel, wherein the tool unit is movable along a feed axis towards the workpiece,
   a measuring device accommodated at the tool unit, wherein the measuring device comprises at least two measuring probes, wherein the at least two measuring probes are spaced apart in a measuring configuration by a basic spacing defining a measurement region, and wherein the basic spacing is selected to be greater than a known reference dimension, and a control device connectable to the measuring device and the tool unit, wherein the measuring device is configured for being moved with the tool unit along the feed axis, wherein the control device is configured for acquiring values detected by the at least two measuring probes of the measuring device, wherein the control device is further configured to:
 detect an actual position of the tool unit along the feed axis, and
 determining an actual spacing of the workpiece on the basis of a displacement path of the tool unit when a probing of the workpiece that is disposed in the measurement region is performed, wherein the probing of the workpiece is performed with the at least two measuring probes at least based on one of the reference dimension and the basic spacing.

2. The grinding machine as claimed in claim 1, wherein the measuring device comprises a measuring head, on which the at least two measuring probes are accommodated, and wherein the measuring head is pivotable for moving the workpiece into the measurement region.

3. The grinding machine as claimed in claim 1, wherein the measuring device comprises a coupling linkage mechanism which allows for pivoting between a measurement position and an out-of-engagement position.

4. The grinding machine as claimed in claim 1, wherein the basic spacing and the actual spacing are at a ratio of about a maximum of 1.2:1.

5. The grinding machine as claimed in claim 1, wherein at least one measuring probe of the at least two measuring probes is deflectable in a proportionality region, and wherein the control device is configured for detecting the deflection of the at least one measuring probe.

6. The grinding machine as claimed in claim 1, wherein the workpiece is mountable on a workpiece spindle which is rotationally driveable in a selective manner about a workpiece spindle axis, wherein the workpiece spindle axis is arranged substantially perpendicular with respect to the feed axis, and wherein the tool spindle comprises a tool spindle axis which is arranged substantially parallel to the workpiece spindle axis.

7. The grinding machine as claimed in claim 6, wherein the tool unit is movable in relation to the workpiece parallel to the workpiece spindle axis.

8. The grinding machine as claimed in claim 6, wherein the control device is configured for moving the tool unit in a selective manner along the feed axis with a coupled movement and of driving the workpiece spindle in a selective manner about the workpiece spindle axis.

9. The grinding machine as claimed in any of claims 7 and 8, wherein the control device is further configured for selectively moving the tool unit parallel to the workpiece spindle axis with a coupled movement.

10. The grinding machine as claimed in claim 8, wherein the control device is further configured for selectively moving the tool unit parallel to the workpiece spindle axis with a coupled movement.

11. The grinding machine as claimed in claim 1, wherein the control device is configured for selectively moving the tool unit with the measuring device in a high speed mode or a probing speed mode.

12. The grinding machine as claimed in claim 1, wherein the control device is configured for selectively driving and displacing the tool unit and the grinding wheel taking into account the actual spacing of the workpiece in a subsequent machining process.

13. The grinding machine as claimed in claim 1, wherein the control device is coupled with a position transducer of the tool unit, wherein the position transducer of the tool unit is configured for detecting the actual position of the tool unit.

14. A machine tool, comprising:
 a workpiece mount comprising at least one workpiece holder for accommodating a workpiece,
 a tool unit comprising a tool spindle for accommodating and driving a tool wherein the tool unit is movable along a feed axis towards the workpiece, wherein the tool unit further comprises a position transducer being configured for detecting actual positions of the tool unit along the feed axis,
 a measuring device which is accommodated at the tool unit, wherein the measuring device comprises at least two measuring probes, wherein the at least two measuring probes are spaced apart in a measuring configuration by a basic spacing defining a measurement region, wherein the basic spacing is selected to be greater than a known reference dimension, and
 a control device which is connectable to the measuring device and the tool unit, wherein the control device is coupled with the position transducer of the tool unit, and wherein the control device is configured to:
  acquire values detected by the at least two measuring probes,
  detect the actual position of the tool unit along the feed axis, thereby determining the basic spacing, and
  determining an actual spacing of a workpiece on the basis of a displacement path of the tool unit when a probing the workpiece is performed with the at least two measuring probes taking into account at least the known reference dimension.

15. The machine tool as claimed in claim 14, wherein the measuring device comprises a measuring head, on which the at least two measuring probes are accommodated, and wherein the measuring head is pivotable for moving the workpiece into the measurement region.

16. The machine tool as claimed in claim 14, wherein the basic spacing and the actual spacing are at a ratio of about a maximum of 1.5:1.

17. The machine tool as claimed in claim 14, wherein the control device is con-figured for selectively driving and displacing the tool unit and the tool in a subsequent machining process under consideration of the detected actual spacing of the workpiece.

* * * * *